United States Patent
Sachdev

Patent Number: 5,310,863
Date of Patent: May 10, 1994

[54] POLYIMIDE MATERIALS WITH IMPROVED PHYSICO-CHEMICAL PROPERTIES

[75] Inventor: Krishna G. Sachdev, Hopewell Junction, N.Y.

[73] Assignee: International Business Machines Corporation, Armonk, N.Y.

[21] Appl. No.: 1,985

[22] Filed: Jan. 8, 1993

[51] Int. Cl.$^5$ .................. C08G 73/12; C08G 69/26
[52] U.S. Cl. .................. 528/353; 528/125; 528/128; 528/170; 528/172; 528/173; 528/174; 528/176; 528/183; 528/188; 528/220; 528/229; 528/350; 428/473.5
[58] Field of Search ........... 528/353, 183, 170, 172, 528/173, 188, 350, 176, 125, 220, 128, 229, 194, 183; 428/473.5

[56] References Cited

U.S. PATENT DOCUMENTS

| | | | |
|---|---|---|---|
| 3,492,270 | 1/1970 | Parish et al. | 528/353 |
| 3,582,498 | 6/1971 | Bilow et al. | 528/353 |
| 3,985,934 | 10/1976 | Farrissey, Jr. et al. | 528/353 |
| 4,063,984 | 12/1977 | Critchley | 528/353 |
| 4,550,156 | 10/1985 | Gallagher | 528/353 |
| 4,690,999 | 9/1987 | Numata et al. | 528/353 |
| 4,764,566 | 8/1988 | Swedo | 528/353 |
| 4,871,833 | 10/1989 | Hupfer | 528/353 |
| 5,021,540 | 6/1991 | Leone-Bay et al. | 528/353 |
| 5,071,997 | 12/1991 | Harris | 528/353 |
| 5,115,090 | 5/1992 | Sachdev et al. | 528/353 |

OTHER PUBLICATIONS

Polymer Preprints, vol. 31, No. 1, 1990, ACS National Meeting, Boston, Harris et al., ". . . And Characterization of Polyimides based on 2,2$^1$-Bis(Trifluoromethyl)-4,4$^1$-Diaminobiphenyl", pp. 342-343.

*Primary Examiner*—John Kight, III
*Assistant Examiner*—P. Hampton-Hightower
*Attorney, Agent, or Firm*—Whitham & Marhoefer

[57] ABSTRACT

Copolyamic acids carrying —CF3 group functionalized aromatic segments in the polymer chain derived from aromatic diamines and dianhydrides with linear-rigid-planar structure interrupted by linear-rigid-noncoplanar segments structure and the corresponding copolyimides films are provided. These copolyimides have low in-plane thermal coefficient of expansion, reduced anisotropy in the optical and dielectric properties, low moisture uptake, and improved polyimide-to-polyimide adhesion.

19 Claims, 4 Drawing Sheets

—(BPDA—PDA)$_{n_1}$—(BPDA—B3FB)$_{n_2}$—

—(BPDA—PDA)$_{n_1}$—(BPDA—B3FT)$_{n_2}$—

BPDA-PDA

BPDA-B3FB

BPDA-B3FT

POLYIMIDE MATERIALS WITH IMPROVED PHYSICO-CHEMICAL PROPERTIES

BACKGROUND OF THE INVENTION

1. Field of the Invention

The present invention is related generally to polyamide based compositions. More particularly, the present invention is related to polyamic acid compositions and copolyimides derived therefrom having low thermal coefficient of expansion (TCE) and low stress while having lower anisotropy in thin film properties and improved polyimide-to-polyimide adhesion. This invention also relates to methods for forming multilayer metal/polyimide structures using low TCE copolyimide as an interlevel dielectric, insulator or passivation layer.

2. Description of the Prior Art

Polyimides have been widely used as high temperature polymer insulator/interlevel dielectric and passivation layer in microelectronics due to lower dielectric constant and other advantages in terms of process simplification and improved device performance in comparison to the commonly employed inorganic materials. The flexible chain polyimides that are derived from non-linear aromatic diamine and/or dianhydride precursors have relatively high thermal coefficient of expansion (TCE), typically in the range of 30-60ppm/° C. compared to 2-3ppm in the case of inorganic materials (non-metallics) such as silicon, silicon oxide, silicon nitride, and ceramic substrates used in the fabrication of electronic device and packaging structures, and 6-25 ppm/C. in the case of commonly employed metallurgy. This TCE mismatch between the flexible chain polyimides and the contacting inorganic materials in electronic device and packaging multilayer structures results in the development of thermal stresses in the fabrication process or during stress testing that involve high temperature excursions often causing film cracking/delamination and thus presents a concern as to the performance reliability of the end product. Recently, due to better TCE match with contacting materials, the low TCE polyimides that are derived from linear-planar dianhydride and diamine precursors, typically, 3,3',4,4'-biphenyl tetracarboxylic acid dianhydride (BPDA) and p-phenylenediamine (pPDA) have gained increasing importance as superior alternatives to the conventional polyimides carrying flexible chain segments such as PMDA-ODA which is derived from 1,2,4,5-pyromellitic dianhydride (PMDA) and 4,4'-oxydianiline (ODA).

U.S. Pat. No. 4,690,999 is directed to certain low thermal expansion polyimides having restricted molecular mobility and the polyimide films may be uniaxially stretched to induce chain orientation. However, the patent does not disclose materials having the properties described in the present invention.

U.S. Pat. No. 5,115,090 is directed to BPDA-PDA and related polyamic acid compositions, and to low TCE polyimides derived therefrom, having certain thermal, mechanical, and passivation properties. However, the materials of the present invention are distinctive and different from those described in this patent.

It has been recognized in the art that the BPDA-PDA and related polyimides having rigid rod-like molecular chains have low in-plane thermal expansion due to in-plane orientation effects and strong interchain interactions which result in highly dense molecular matrix. It is generally known that the polyimide films formed from polyamic acid compositions derived from linear-planar dianhydrides and diamines such as BPDA and pPDA by spin coating and curing on silicon wafers or other inorganic substrates show large anisotropy, particularly as related to thermomechanical and optical properties compared to flexible chain polyimides.

SUMMARY OF THE INVENTION

It is an object of this invention to provide improved, low stress copolyimides having lesser anisotropic properties than the commonly known BPDA-PDA and related rigid-rod polyimides.

Another object of the invention is to provide copolyimides comprising a preponderance of linear-planar chain segments interrupted by non-planartrifluoromethyl (—CF3) group carrying aromatic units, which copolyimides have low in-plane TCE, low dielectric constant, low stress, high glass transition temperature, high thermal and thermooxidative stability, decreased difference in the in-plane and out-of-plane properties, and improved adhesion, especially the polyimide-to-polyimide adhesion.

A further object of the invention is to provide a method of preparing copolyamic compositions for the copolyimides having improved properties relative to the BPDA-PDA and related low TCE polyimides.

It is yet another object of the present invention to provide a method of using these copolyimides as interlevel dielectric and for passivation of metallurgy in integrated circuit (IC) devices.

Other objects and advantages will become evident from the following detailed description of the invention.

According to the invention, new copolyimides include rigid or semi-rigid aromatic dianhydrides, linear aromatic diamines, and linear or non-coplanar aromatic diamines which include a —CF3 group. These new copolyimides have a low in-plane thermal coefficient of expansion, reduced anisotropy in the optical and dielectric properties, low moisture uptake, and improved polyimide-to-polyimide adhesion.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

The above and various other objects and advantages of the present invention are achieved by copolyamic acid compositions prepared by a condensation polymerization reaction involving BPDA or a related relatively rigid-planar dianhydride and two or more linear aromatic diamines of which at least one carries —CF3 group(s) on the aromatic ring with contributory planar and non-coplanar conformations. These polyamic acid formulations employ a suitable solvent, such as n-methylpyrrolidone (NMP). They preferably include an equimolar dianhydride:diamine ratio or a stoichiometry offset using 100 mole parts of the combined diamines and 98.0-100 mole parts of an aromatic dianhydride (using a slight excess mixed diamines relative to dianhydride can be advantageous). The formulations yield gel-free polymers having desired viscosity and molecular weight. After the reaction goes to completion, the resultant copolyamic acid composition has free amine groups present from the excess diamine used in the reaction. These reactive amine groups are capped by reacting with an aromatic anhydride such as phthalic or substituted phthalic anhydride. The capped polyamic acid becomes storage stable having no residual reactive functional groups that can otherwise cause slow chemical change resulting in poor shelf-life, and cause degradation of the corresponding polyimide film properties. It is noted that the solids range from about 5-25% by weight in the solvent.

We have discovered that the copolyimide films derived from copolyamic acid compositions synthesized using 3,3',4,4'-biphenyl tetracarboxylic acid dianhydride (BPDA) and mixtures of p-phenylene diamine (p-PDA or PDA) and 2,2'-bis(trifluoromethyl)benzidine (B3FB or BTFMB) at varying ratios of PDA:B3FB, have decreased anisotropy in the refractive index, less swelling in NMP, lower moisture absorption, low residual stress, and superior polyimide/polyimide adhesion in comparison to BPDA-PDA homopolymer. Increases in the B3FB component causes change toward more isotropic polyimide properties, but there is considerable increase in thermal expansion with temperature and the films show higher stress relative to the copolyimides; therefore, the (BPDA-PDA)x-(BPDA-B3FB)y preferably has a preponderance of the BPDA-PDA chain segment. The copolyimides of the present invention have $T_g$ above 300° C. and, depending on the constituents from which they are derived, their TCE may range up to 15 ppm per ° C. at 100° C. when determined in the temperature range of 75°-125° C.

Figure 1A:
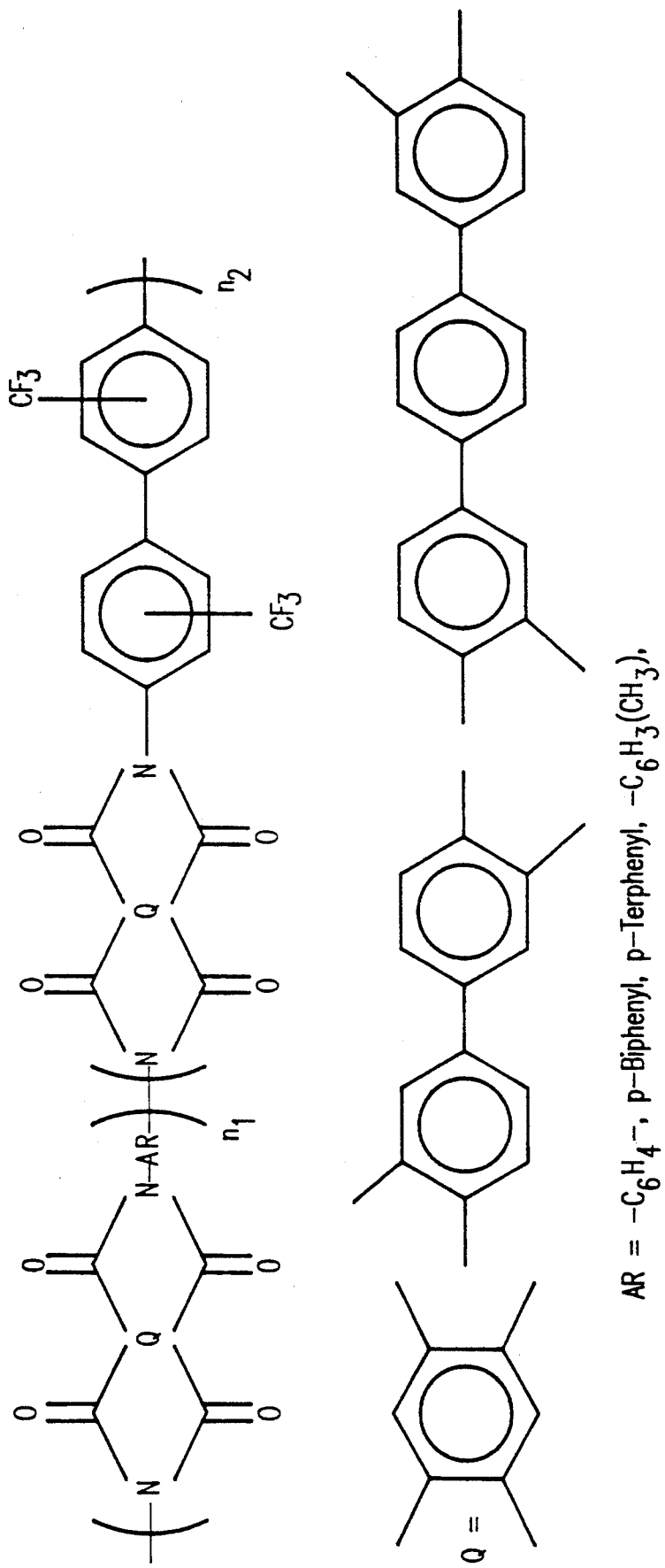
FIGS. 1a and 1b are chemical structures of copolyimides according to the present invention.
Figure 1B:
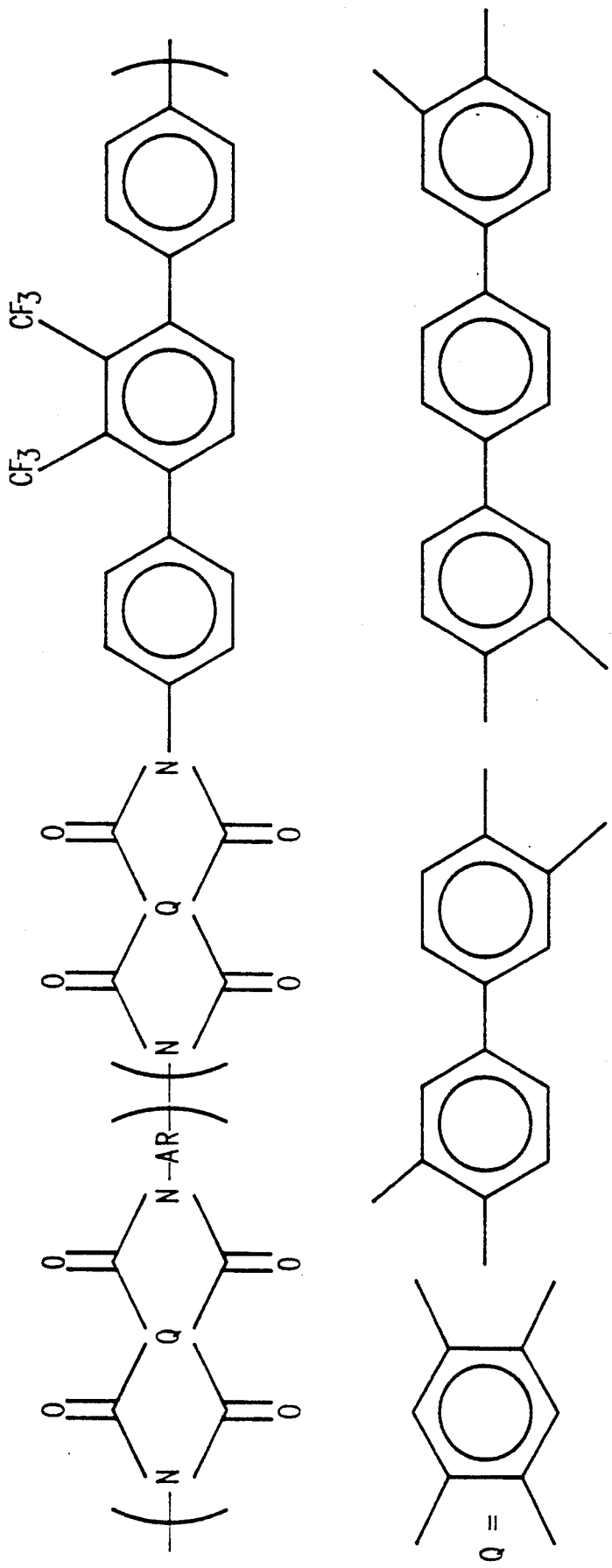
Figure 2A:
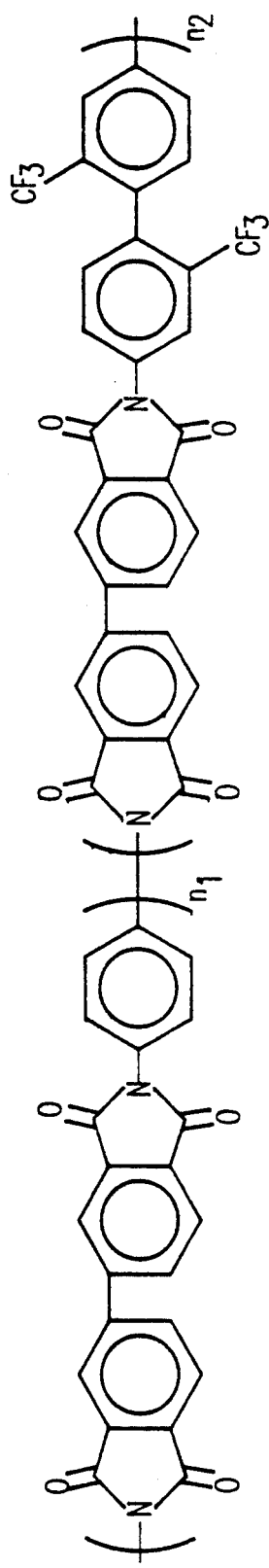
FIGS. 2a and 2b are chemical structures of specific preferred copolyimides according to the present invention.
Figure 2B:
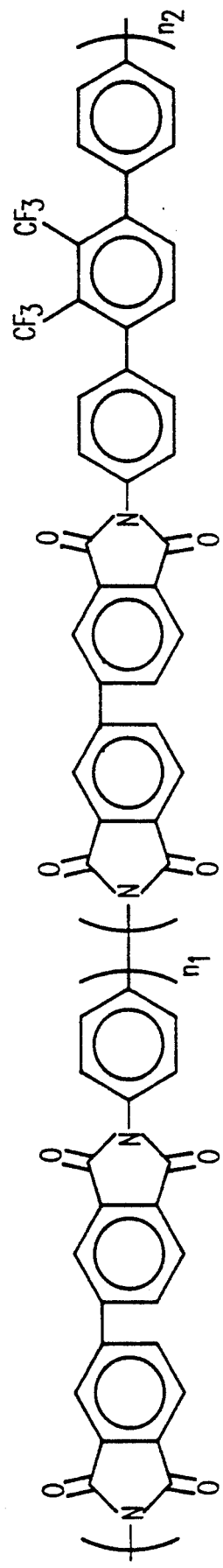
Figure 3A:
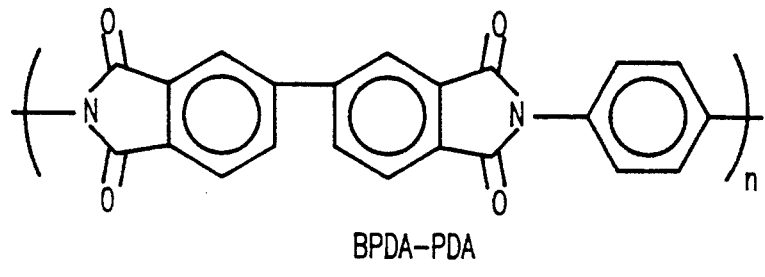
FIGS. 3a, 3b, and 3c are chemical structures of specific homopolymers which correspond with the chemical structures of copolyimides shown in FIGS. 2a and 2b.
Figure 3B:
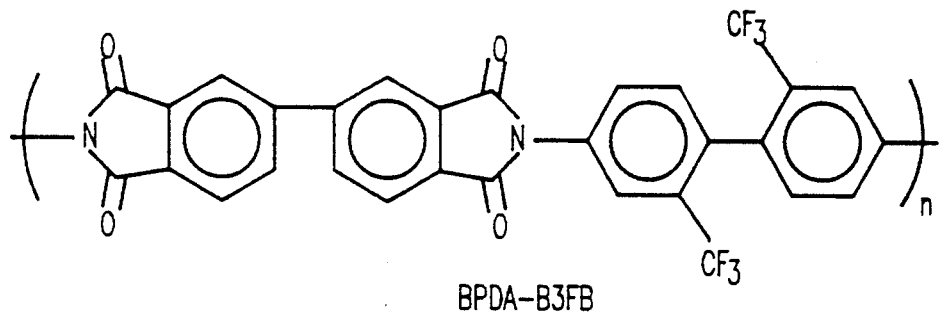
Figure 3C:
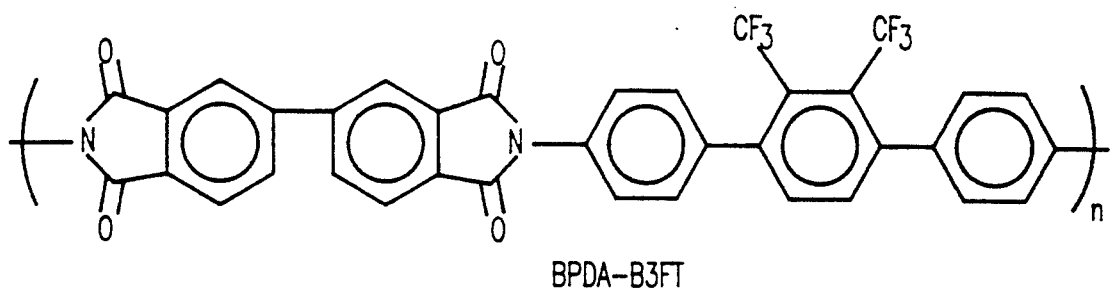

FIGS. 1a and 1b show the chemical structures of the copolyimides according to the present invention. FIGS. 2a and 2b show the chemical structures of particularly preferred copolyimides according to the present invention. FIGS. 3a–c show the chemical structures of the homopolymers used in the copolyimides of FIGS. 2a and 2b. The representative mechanical properties of fully cured films of the copolyimides and the homopolymers are summarized in Table 1. For the polyamic acid or the polyamic ester intermediates which lead to the copolyimides of the present invention, examples of the preferred automatic dianhydrides are: 3,3',4,4'-biphenyl tetracarboxylic acid dianhydride (BPDA), 1,2,4,5-pyromellitic dianhydride (PMDA), 3,3',4,4'-benzophenone tetracarboxylic acid dianhydride (BTDA), and p-terphenyl-3,4,3",4"-tetracarboxylic acid dianhydride (p-TPDA), while examples of the preferred aromatic diamine monomers are: p-phenylene diamine (p-PDA), p-diaminobiphenyl (DABP or benzidine), 4,4"-diaminoterphenyl (DATP), 2-methyl 1,4-phenylene diamine (2Me-PDA), 2,5-diamino toluene, and 3,3'-bis(methyl)benzidine which are used in combination with fluorine containing aromatic diamines. Examples of such fluorine containing aromatic diamines are 2,2'-bis(trifluoromethyl)benzidine (B3FB), bis(trifluoromethyl) 4,4"-diaminoterphenyl (B3FT) including 2',3'-bis(trifluoromethyl)-4,4"-diamino-p-terphenyl and 2',5'-bis(trifluoromethyl)-4,4'-diamino-p-terphenyl, 3,5-diaminobenzotrifluoride (DBT), 2,5-diaminobenzotrifluoride, and 3,3'-bis(trifluoromethyl)-4,4'-diaminobiphenyl, or 3,3'-bis(trifluoromethyl) benzidine.

Thin films of these polyamic acids are formed by spin coating on silicon wafers or ceramic substrates and thermally imidizing ("curing") to form the corresponding polyimides.

Examples of preferred polyimides according to the present invention are copolyimides comprising BPDA-PDA/B3FB, BPDA-PDA/B3FT, PMDA-PDA/B3FB, PMDAPDA/B3FT, pTPDA-PDA/B3FB, pTPDA-PDA/B3FT, BPDA-DABP/B3FB, pTPDA-DABP/B3FB. Preferred copolyimide compositions constitute up to 30% of the —CF3 group containing diamine derived segments relative to those derived from the diamine with no —CF3 functional group.

TABLE 1

Mechanical Properties of (BPDA-PDA)x-(BPDA-B3FB)y Copolyimide Films

| PDA:B3FB (thickness)* | Young's modulus calculated @ 1% (GPa) | Ultimate Tensile Strength (MPa) | Elongation-at-Break (Eb) (%) |
|---|---|---|---|
| 90:10 (12.5μm) | 9.2 | 410 | 45 |
| 85:15 (14.7) | 8.0 | 360 | 36 |
| 80:20 (12.3) | 7.4 | 400 | 45 |
| 75:25 (14.0) | 7.9 | 387 | 40 |
| 50:50 (11.5) | 7.2 | 327 | — |
| BPDA-B3FB (17.4) | 5.7 | 245 | 30–40 |
| BPDA-PDA (11.5) | 10.2 | 525 | 45–50 |

*The number in parenthesis is the thickness (μm) of various polyimide films. In the case of copolyimide films, two coats were used to obtain these thicknesses whereever necessary. Cross-head speed of 0.5-2mm/min was used.

In addition to the mechanical properties given in Table 1, the (BPDA-PDA)x-(BPDA-B3FB)y copolyimide films were characterized for the in-plane thermal expansion, residual stress on silicon wafers, refractive index anisotropy, and dielectric constant in comparison to the homopolymers BPDA-PDA and BPDAB3FB. The following data are representative of the copolyimide properties with change in PDA:B3FB composition in the precursors.

In-Plane Thermal Expansion (TCE, pcm/° C.) at 100° C. (measured by TMA Method in the temperature range 75°-125° C.):

For the copolyimides derived from precursors comprising BPDA-PDA/B3FB compositions with PDA/B3FB ratio as 90/10 and 80/20, the average TCE was observed to be 7 ppm and 10 ppm, respectively. In comparison, the BPDA-PDA polyimide films gave a value of 5 ppm while the BPDA-B3FB films showed 22-24 ppm/° C. when measured under the same conditions.

Refractive Index (RI) of copolyimides as a function of composition

Measurement of in-plane and out-of-plane refractive index of copolyimide films showed a gradual decrease in in-plane RI with increasing proportion of B3FB relative to PDA in the copolyimide precursors. With the 90/10 PDA/B3FB ratio, the in-plane and out-of-plane RI was observed to be 1.81 and 1.61, respectively, while with 50/50 composition, values of 1.73 and 1.59, respectively, were obtained. Similar measurements with the homopolymers showed values for the BPDA-PDA polyimide films as 1.845 (in plane RI) and 1.612 (out-of-plane RI), and the BPDA-B3FB films as 1.65 and 1.59, respectively.

According to these data, the BPDA-PDA polyimide films show most anisotropy in refractive index while the BPDA-B3FB films are essentially isotropic. Comparison of these data with the 90/10 and 50/50 copolyimide films indicates about 15% reduction in birefringence for the 90/10 composition, and about 40-45% reduction for the 50/50 composition.

Residual Stress of films cured on silicon wafers (polyimide thickness: 8-12 um)

The copolyimides having up to 75/25 PDA/B3FB ratio showed residual stress in the range 0-1 kpsi which stress is similar to the value obtained for BPDA-PDA polyimide. In comparison the BPDA-B3FB polyimide showed 2.6-2.7 kpsi; PMDA-ODA films having non-linear chain segments showed 3-4 kpsi, and the BTDA-ODA polyimide films gave a value of 5-6 kpsi.

Dielectric Constant measured by capacitor technique using Al/Cu—Polyimide—Al/Cu dot (BPDA-PDA)x-(BPDA-B3FB)y copolyimides up to 70/30 PDA/B3FB ratio were measured to have dielectric constant of 3.0-3.2 at 100 KHz and dissipation factor 0.002. In comparison BPDA-PDA polyimide has dielectric constant 2.9-3.0; BPDA-B3FB 2.8, and standard polyimide (typically PMDA-ODA) has 3.3-3.5 dielectric constants under the same conditions.

A distingushing feature of the copolyimides of the present invention is a significant decrease in the optical anisotropy or birefringence as shown by the refractive index relative to the commmonly known rigid-rod polyimides, typically BPDA-PDA. It was surprising to find that such a decrease in the difference (or birefringence) between the in-plane and out-of-plane refractive indices of the copolyimide films was not accompanied by much increase in the in-plane TCE and the residual stress up to 75/25 PDA/B3FB composition.

Synthesis—Methods and Materials

In order to determine the effect of inclusion of —Ar(CF3)—Ar(CF3)—segment into BPDA-PDA chain structure, a series of copolyamic acid compositions were synthesized using p-phenylene diamine (p-PDA) and 2,2'-bis(trifluoromethyl) benzidine (BTFMB or B3FB) mixtures at varying ratio in conjunction with 1,2,4,5-pyromellitic dianhydride (PMDA), 3,3',4,4'-biphenyl-tetracarboxylic acid dianhydride (BPDA), and 3,3'-4,4'-benzophenone tetracarboxylic acid dianhydride (BTDA) to obtain various copolyimides as shown in FIGS. 1a-b. In each case, high purity starting materials (99+%) were either obtained directly from commercial sources or purified by crystallization or sublimation methods whenever necessary. High purity PMDA (mp 286°-288° C.), zone refined pPDA (mp 141°-143° C.), BPDA (mp 298°-301° C.) obtained from Chriskev Co., were used as received. The bis-trifluoromethylbenzidine (B3FB) was purchased from DayChem Laboratores, Centerville, Ohio. This diamine was further purified by crystallization from methanol-H2O or ethylacetate/hexane, followed by vacuum drying. Copolyamic acid intermediates such as BPDA-PDA/B3FB were prepared by condensation polymerization reaction of BPDA and PDA/B3FB in NMP with PDA as the predominant diamine. These compositions were made with equimolar BPDA:diamines ratio or with stoichiometry offset.

EXAMPLE 1

Synthesis of BPDA-PDA/B3FB Copolyamic Acid (90/10 PDA/B3FB Ratio) and Preparation/Properties of Corresponding Polyimide Films Polyamic acid: Solids Content=15.4%;
Stoichiometry: 1.00:0.9898 (Diamine: BPDA)

A mixture of p-phenylenediamine (zone refined, recrystallized, or resublimed) 9.72 g (0.09 mole) and 3.2 g (0.01 mole) 2,2'-bis(trifluoromethyl)benzidine was dissolved in 230 g NMP (minimum purity 99.8%) in a three-neck flask equipped with a mechanical stirrer, thermometer, and Argon or $N_2$ purge three-way valve. While the solution was being stirred gently, 29.1 g (0.09898 mole) BPDA solids were added in portions within 20 min during which time the temperature of the reaction mixture was maintained between 26°-32° C. After the addition was complete, stirring of the reaction mixture was continued overnight at room temperature (~22°-24° C.) when a clear viscous solution was obtained. The unreacted amine end groups remaining due to stoichiometry offset were capped by the addition of 0.28 g of freshly sublimed phthalic anhydride and to complete the reaction, stirring was continued for another 4-5 hrs. The polyamic acid solution was stored in refrigerator at 4°-5° C. with protection from moisture.

Representative Properties of the Polyamic Acid

Solution viscosity (measured according to Canon-Fenske method at 25° C.)=15,960 centistokes.

Polyimide Films

To prepare polyimide film, the polymer was spin coated on silicon wafers at 2000 rpm spin speed for 45 sec. and baked/cured to 350° C. This yielded about 8.3-8.5 μm thick fully cured polyimide films. For mechanical properties, thicker films were formed in two coats at 2500 rpm/45 seconds with 200° C. bake in-between coats. After the final coat, the composite film was cured to 350°-400° C. to give about 12.5 μm thick film. mechanical properties are listed in Table 1.

EXAMPLE 2

BPDA-PDA/B3FB Co-Polyamic Acid Formulation with 80/20 PDA/B3FB Ratio and Preparation/Properties of the corresponding Polyimide Films Polyamic acid: % solids=15.1; stoichiometry=1:1

A mixture of p-phenylene-diamine (zone refined, recrystallized, or resublimed), 4.32 g (40 mmole) and 3.2 g (10 mmole) 2,2'-bis(trifluoro- methyl) benzidine was dissolved in 125 g NMP (minimum purity 99.8%) in a three-neck flask equipped with a mechanical stirrer, thermometer, and Argon or $N_2$ purge three-stirrer way valve. While the solution was being stirred gently, 14.7 g (50 mmole) BPDA solids were added in portions within 15 min during which time the temperature of the reaction mixture was maintained between 26°-32° C. After the addition was complete, stirring of the reaction mixture was continued overnight at room temperature when a clear viscous solution was obtained. The polyamic acid solution was stored in refrigerator at 4°-5° C. with protection from moisture until use.

Representative properties

Solution viscosity measured by Canon Fenske method at 40° C. = 34,000 centistokes.

Polyimide Films

Film thickness of cured films formed at 2500 rpm for 45 sec. and curing to 400° C. on silicon wafers = 13.5-14 μm. Mechanical Properties using 12.3 μm thick films are listed in Table 1.

Dielectric constant = 3.1 at 100 KHz and in-plane thermal expansion at 100° C. (measured in the 75°-125° C. range) = 10-11 ppm/° C.

EXAMPLES 3-4

BPDA-PDA/B3FB Copolyamic Formulation with 70/30 and 50/50 PDA/B3FB Ratio and Properties of the Corresponding Polyimide Films Polyamic Acids : % Solids = 15.1; Stoichiometry: 1:1

These polymers were prepared similar to the method described in Example 2 using the following mole equivalents of the reactants in NMP as solvent:

| Composition (PDA:B3FB) | PDA | B3FB | BPDA | NMP |
| --- | --- | --- | --- | --- |
| 70:30 mmoles: | 3.78 g (35) | 4.8 g (15) | 14.7 g (50) | 130 g |
| 50:50 mmoles: | 2.7 g (25) | 8.0 g (25) | 14.7 g (50) | 143 g |

Polyimide Films

Thickness of cured films formed at 2000 rpm for 45 sec and curing to 400° C. on silicon wafers = 9.0-9.5 μm. Mechanical Properties using 11-12 μm thick films are given Table 1. Dielectric constant = 3.1 at 100 KHz.

EXAMPLE 5

BPDA-PDA/2',3'-bis(trifluoromethyl)-4,4''-diamino p-terphenyl Copolyamic Acid with 90/10 PDA/3F diamine ratio and the Corresponding Polyimide Polyamic acids: % Solids = 12.3; Stoichiometry, 1:1

A mixture of p-phenylene-diamine (99+% purity), 4.86 g (45 mmole) and 1.98 g (5 mmole) 2',3'-bis(trifluoromethyl)4,4'-diamino-p-terphenyl, or 3F,3F diamino terphenyl (B3FT, mol wt 396.1) was dissolved in 154 g NMP (minimum purity 99.8%) in a three-neck flask equipped with a mechanical stirrer, thermometer, and Argon or N₂ purge three-way valve. While the solution was being stirred gently, 14.70 g (50 mmole) BPDA solids were added in portions within 15 min during which time the temperature of the reaction mixture was maintained between 26°-32° C. After the addition was complete, stirring of the reaction mixture was continued overnight at room temperature when a clear viscous solution was obtained. Typical viscosity of this formulation at 40° C. was measured to be 21,000-23,000 centistokes.

About 9.5 μm thick polyimide films were formed with this material by spin casting on silicon wafers at 2000 rpm and bake/cure to 400° C. In-plane thermal expansion at 100° C. measured in the 75°-125° C. range = 8-9 ppm/° C.

EXAMPLE 6

BPDA-2',3'-bis(trifluoromethyl)-4,4''-diamino-p-terphenyl Polyamic Acid and the Corresponding Polyimide Polyamic acid: % Solids = 15.5; Stoichiometry, 1:1

2',3'-bis(trifluoromethyl)4,4''-diamino-p-terphenyl, 1.58 g (4 m moles) was dissolved in 15 g NMP with stirring under dry N₂, and 1.176 g (4 mmoles) of BPDA solids were added within 5 min with gentle stirring. The mixture was allowed to stir overnight at room temperature (~22°-24° C.) when a clear relatively low viscosity solution of polyamic acid was obtained. Solution viscosity of this formulation at 25° C. = 6000-6500 centistokes. Spin application on silicon wafers at spin speed of 2000 rpm for 45 sec followed by bake/cure to 350° C. gave about 3 μm thick polyimide films.

General Method of Preparation of Free-Standing Films

Polyimide films used for the properties described above were prepared according to the following method. To obtain free films, polyamic acid solutions were spin coated on silicon wafers with or without a thin silicon oxide surface film. For high viscosity polymers, a single coat at 2 krpm/45 sec was applied and subjected to bake/cure cycle involving 80°-90° C. for 45 min, 140°-150° C. for 45min, 220°-240° C. for 45 min, all in nitrogen, then 300° C. for 30 min, and 375°-400° C. for 60 min in N₂ or forming gas. In most cases when no adhesion promoter was applied to polymer coating, the films came off readily after the high temperature cure. The film removal could also be facilitated by immersing the wafers in boiling water for a few minutes. When the film was cast and cured on surface treated (silane adhesion promoter) oxide wafers, these required buffer HF dip for removal. Typical thickness of the cured films under these conditions was 9-12μm. With the lower viscosity material, 7-8μm thick films were formed by multiple coatings (two or more) each at spin speed 1.5-1.7krpm and in-between bake of 80°-90° C./30 min and 140°-150° C./30 min prior to second application.

Thermal Expansion Measurements

Coefficient of linear thermal expansion in each case was measured with modified DuPont 943 Thermomechanical Analyzer (TMA). The experimental procedure for in-plane TCE measurements of thin films are known and can be found in such publications as: R. Bruce Prime, chapter 5, pp 498-506 in "Thermal Characterization of polymeric materials", Ed., Edith. A. Turi, Academic Press, 1981; R. B. Prime, E. M. Barralt, II, J. A. Logan, P. J. Duke, AIP Conf. Proc. 17, 72-83 (1974); R. GAskill, E. M. Barralt, II, Thermochim Acta, 12, 102-104 (1975). Polyimide films were cut into 8 mm long and 3 mm wide strips and mounted on specially designed Invar micro chucks using a template aligner such that the original effective film length remains between 4.9-5.2 mm for the various samples. Analyses were conducted in air at a heating rate of 5° C./min over a range 25°-165° C. with a 2 g load applied to prevent the films from twisting or deforming during the run. To obtain the average coefficient of linear thermal expansion at 100° C., dimension change in the original film length was recorded in runs up to 165° C. for three consecutive heating cycles. Of the three runs, the first was generally discarded while data from the subsequent two runs was taken as representative for the film. The TCE values computed in the 75°–125° C. range were corrected for expansion of Invar and quartz (used as hooks) which is 1.6 and 0.55, respectively at 100° C. (data from American Institute of Physics Handbook, 3rd Ed., 1972), and instrument sensitivity calibration factor of 0.9 based on analysis of pure Al foil (TCE at 100° C.=24.5ppm/° C.), and verification from analysis of Cu foil (TCE at 100° C.=17.5 ppm/° C).

Thermal Coefficient Of Expansion (TCE) OF BPDA-PDA/B3FB Copolyimides

These copolyimides have PDA/B3FB ratio in the range of 90:10 to 50:50 and showed gradual increase in TCE with increasing B3FB percentage relative to PDA. Following are the typical data on TCE at 100° C.:

| PDA/B3FB ratio: | 90/10 | 80/20 | 70/30 | 50/50 |
| --- | --- | --- | --- | --- |
| TCE (ppm) = | 7 | 10 | 11 | 11 |

The homopolymer films under the same conditions showed 5 ppm for BPDA-PDA and 23–26 ppm for BPDA-B3FB.

Thermal expansion measurements at higher temperature up to 225° C. showed essentially no change in TCE from the value at 100° C. for up to 70/30 compositions. With further increases in temperature up to 300° C., copolyimide film comprising 90/10 and 80/20 ratio of PDA/B3FB showed in-plane TCE of about 22 ppm/° C. at 300. For compositions with 70/30 (PDA/BF3B) and further increases in B3FB, there is a significant increase in TCE starting at 300° C., but no evidence of glass transition temperature up to 50/50. This behavior is different from the BPDA-PDA polyimide where no significant increase in TCE is observed up to 350° C. In contrast, the BPDA-B3FB polyimide films show large increases in dimension above 275° C. No distinct break in the dimension change-temperature curve is observed in any of these polyimides or copolyimides indicating the absence of a well defined Tg.

Dielectric constant was determined according to the capacitance method and stress-strain properties were measured by the standard tensile test using the Instron Model 1122 at cross-head speed of 0.5–2 mm/min. Runs at higher cross-head speed (10 mm/min) gave higher elongation-at-break but showed problem of reproducibility.

The copolyimide films were prepared from the corresponding copolyamic acids by spin coating on silicon wafers and bake/cure to 400° C. Free standing films for thermal expansion and for stress-strain properties were obtained by coating on untreated wafers while for residual stress, the wafers were surface cleaned by exposure to $O_2$ plasma followed by application of 0.1% solution of gamma-aminopropyl triethoxysilane in water or in aqueous ethanol prior to polymer coating. Typical bake/cure cycle involved 30 min each at 85° C. (hot plate), 140°–150° C. and 230° C. in a $N_2$ purged oven, followed by 300° C. for 30 min, and 400° C. for 60 min in a furnace with $N_2$ or forming gas flow.

Polyimide-to-Polyimide Adhesion (BPDA-PDA)x-(BPDA-B3FB)y Copolyimides

Fabrication of multilayer metal structures using polyimide insulator generally involves sequential processing such that each subsequent layer is built by first forming polymer coating over the previous fully cured and metallized polyimide layer. It is well known that in the case of high Tg conventional polyimides such as PMDA-ODA or the rigid-rod low TCE polyimides such as BPDA-PDA, special process conditions must be employed to establish interface integrity in forming second polyimide layer over a first 400° C. cured polyimide. It was found that in the case of copolyimides of the present invention with the representative example of (BPDA-PDA)x-(BPDA-B3FB)y, the polyimide-to-polyimide adhesion is generally superior to the BPDA-PDA and related low TCE polyimides, when processed under similar conditions of surface activation and modification with A1100 silane coupling agent. Samples for peel adhesion test were prepared by $O_2$ RIE (2 min) exposure of the fully cured polyimide followed by application of gamma-amino propyl triethoxy silane (A1100, Union Carbide trade name) as 0.1% solution in ethanol-water (95:5), application of the second layer of the copolyamic acid precursor followed by bake/cure to 400° C. to form the copolyimide. The thickness of the second layer (which is to be peeled) was typically in the range of about 14–17μm over the first layer which was about 8–9μm.

EXAMPLE 7

Precleaned silicon wafers or ceramic substrates were $O_2$ plasma cleaned and primed with A1100 solution as adhesion promoter and (BPDA-PDA)x-(BPDA-B3FB)y copolyamic acid compositions spin applied followed by bake/cure up to 375°–400° C. in inert or reducing ambient. Surface activation of this fully cured film was achieved by subjecting to $O_2$ RIE for 2–5 min at 100–200 watts, 50–300 mTorr pressure, and 50 sccm gas flow, such that 1000–2000 Å surface film is removed. This was followed by application of 0.1% solution of A1100 in 95:5 ethanol-water, and drying at 85° C. for 5–10 min when using ceramic substrates (optional for films on silicon wafers), and a second layer of the polymer was applied and cured up to 375°–400° C. as above to form about 14–17μm thick films. Wherever necessary, two coatings were applied with in-between hot plate bake at 85° C./30 min and 170°–190° C./45 min and the composite coatings finally cured to 400° C. to form the desired thickness. For the peel test, these films were cut into strips with width of 3.0 mm or 6.35 mm. Adhesion measurements using the 90° Peel test for the representative samples gave the following relative peel values at cross-head speed of 0.5 mm/min in comparison to BPDA-PDA polyimide.

| PDA/B3FB Ratio: | 90/10 | 80/20 | 70/30 |
| --- | --- | --- | --- |
| Peel Force (g/mm) | 76 | 96 | 109 |

BPDA-PDA polyimide under the same conditions gave PI/PI adhesion value of 75 g/mm.

It is noted that unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the methods and materials described herein are preferred. Unless mentioned otherwise, the techniques employed or contemplated herein are standard methodologies well known to one of ordinary skill in the art and the temperatures are in degrees centigrade (° C.).

It is understood that the methods, examples and embodiments, etc., described herein are only illustrative and not limiting, and that various modifications or changes in light thereof, including the use of mixtures of two or more dianhydrides and mixtures of three or more aromatic diamines, will be suggested to persons skilled in the art and are to be included within the spirit and purview of this application and scope of the appended claims.

Having thus described my invention, what I claim as new and desire to secure by Letters Patent is as follows:

1. A copolyamic acid composition, comprising the following components:
    about 100 mole parts of a combination of a linear aromatic diamine and a linear or non-coplanar aromatic diamine containing a —$CF_3$ group, said linear or non-coplanar aromatic diamine containing said —$CF_3$ group comprising 5-30% of said combination and said linear aromatic diamine comprising 70-95% of said combination; and
    about 98 to 100 mole parts of a rigid or semi-rigid aromatic dianhydride.

2. The composition of claim 1 wherein said linear aromatic diamine is selected from the group consisting of p-phenylenediamine (p-PDA), p-diaminobiphenyl (DABP or benzidine), 4,4''-diamino-p-terphenyl (DATP); 2-methyl-1,4-phenylene diamine (2Me-PDA), 2,5-diaminotoluene, 3,3'-di(methyl)-4,4'-diaminobiphenyl, 3,3',5,5'-tetramethyl-4,4'-diaminobiphenyl, and combinations thereof.

3. The composition of claim 1 wherein said linear or non-coplanar aromatic diamine containing said —$CF_3$ group is selected from the group consisting of 2,2'-bis(trifluoromethyl)-benzidine (B3FB), 2',3'-bis(trifluoromethyl)-4,4'-diamino-p-terphenyl (B3FT), 2,2''-bis(trifluoromethyl)-4,4''-diamino-p-diamino-p-terphenyl, 2',5'-bis(trifluoromethyl)-4,4''-diaminoterphenyl, 3,5-diaminobenzotrifluoride (DBT), 2,5-diaminobenzotrifluoride, and combinations thereof.

4. The composition of claim 1 wherein said rigid or semi-rigid aromatic dianhydride is selected from the group consisting of 1,2.4,5-pyromellitic dianhydride (PMDA), 3,3',4,4'-biphenyltetracarboxylic dianhydride (BPDA), 3,3',4,4'-benzophenone tetracarboxylic acid dianhydride (BTDA); p-terphenyl-3,4,3'',4'-tetracarboxylic acid dianhydride (p-TPDA), and combinations thereof.

5. The composition of claim 1 further comprising a sufficient amount of an aromatic anhydride to end-cap said linear aromatic diamines and said linear or non-coplanar aromatic diamines in said composition.

6. The composition of claim 5 wherein said aromatic anhydride is phthalic anhydride or a substituted phthalic anhydride.

7. The composition of claim 1 further comprising N-methylpyrrolidone as a solvent wherein said components constitute about 5 to 25% by weight as solids.

8. The composition of claim 1 comprising 70-95 mole parts of p-phenylenediamine (pPDA), 5-30 mole parts of 2,2'-bis(trifluoromethyl) benzidine (B3FB), and 98 to 100 mole parts of 3,3',4,4'-biphenyltetracarboxylic dianhydride (BPDA).

9. The composition of claim 1 comprising 70-95 mole parts of p-phenylenediamine (pPDA), 5-30 mole parts of 2',3'-bis(trifluoromethyl)-4,4''-diamino-p-terphenyl (B3FT) and 98 to 100 mole parts of 3,3',4,4'-biphenyltetracarboxylic dianhydride (BPDA).

10. The composition of claim 1 having an average molecular weight ranging from about 20,000 to 45,000, a viscosity ranging from about 2000 to 40,000 centistokes, and solids ranging from about 10% to about 16% by weight.

11. A copolyimide prepared from the composition of claim 1.

12. The copolyimide of claim 11 prepared from the following components:
    at least one rigid or semi-rigid aromatic dianhydride selected from the group consisting of 3,3',4,4'-biphenyltetracarboxylic dianhydride (BPDA) and 1,2,4,5-pyromellitic dianhydride (PMDA);
    p-phenylenediamine (pPDA); and
    at least one linear or non-coplanar aromatic diamine containing said —$CF_3$ group selected from the group consisting of 2,2'-bis (trifluoromethyl)-benzidine (B3FB) and 2',3'-bis(trifluoromethyl)4,4''-diamino-p-terphenyl (B3FT).

13. The copolyimide of claim 11 having a composition selected from the group consisting of BPDA-PDA/B3FB, BPDA-PDA/B3FT, PMDA-PDA/B3FB, PMDA-PDA/B-3FT, pTPDA-PDA/B3FB, pTPDA-PDA/B3FT, BPDADABP/B-3FB, and pTPDA-DABP/B3FB.

14. The copolyimide of claim 11 having glass transition temperature (Tg) above 300° C.

15. The copolyimide of claim 11 having a thermal coefficient of expansion up to 15 ppm per degree at 100° C. when determined in the temperature range of 75°-125° C.

16. The copolyimide of claim 11 having polyimide-to-polyimide adhesion greater than that of BPDA-PDA polyimide.

17. A film made from the copolyimide of claim 10.

18. The film of claim 18 having an in-plane refractive index less than that of a BPDA-PDA polyimide film.

19. A multilayer interconnect structure, comprising the copolyimide of claim 10 as an interlevel dielectric, insulator or passivation layer.

* * * * *